United States Patent

Permuy

(10) Patent No.: US 9,812,922 B2
(45) Date of Patent: Nov. 7, 2017

(54) ACTIVE MAGNETIC BEARING COMPRISING MEANS FOR DAMPING THE RADIAL MOTION OF A SHAFT OF A ROTARY MACHINE

(71) Applicant: GE Energy Power Conversion Technology Ltd., Rugby Warwickshire (GB)

(72) Inventor: Alfred Permuy, Rueil-Malmaison (FR)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 965 days.

(21) Appl. No.: 14/066,960

(22) Filed: Oct. 30, 2013

(65) Prior Publication Data

US 2014/0117801 A1    May 1, 2014

(30) Foreign Application Priority Data

Oct. 31, 2012 (FR) .................................. 12 60419

(51) Int. Cl.
    *H02K 7/09* (2006.01)
    *F16F 15/03* (2006.01)
    *F16C 32/04* (2006.01)

(52) U.S. Cl.
    CPC ............ *H02K 7/09* (2013.01); *F16C 32/048* (2013.01); *F16C 32/0457* (2013.01); *F16F 15/03* (2013.01)

(58) Field of Classification Search
    CPC ..... H02K 7/09; F16C 32/044; F16C 32/0444; F16C 32/0457; F16C 32/0451; F16C 32/048; F16F 15/002; F16F 15/03
    (Continued)

(56) References Cited

U.S. PATENT DOCUMENTS 3,518,581 A * 6/1970 Hughes .................... H03H 7/18
                                                   333/167
3,813,593 A * 5/1974 Tice ........................ H02P 9/105
                                                    322/58
(Continued)

FOREIGN PATENT DOCUMENTS

CN        101099048 A     1/2008
EP        2253852         11/2010
               (Continued)

OTHER PUBLICATIONS

R. Larsonneur; Principle of Active Magnetic Suspension; "Magnetic Bearings"; DOI 10.1007/978-3-642-00497-1 2; Springer-Verlag Berlin Heidelberg 2009.
(Continued)

*Primary Examiner* — John K Kim
*Assistant Examiner* — Noli Manaloto
(74) *Attorney, Agent, or Firm* — GE Global Patent Operation; Scott R. Stanley (57) ABSTRACT

An active magnetic bearing comprising a plurality of electromagnetic actuators, each actuator receiving for control thereof an input current and being able to exert a radial force on a shaft of a rotary machine, with respect to the rotation axis of said shaft, the shaft being able to be held without contact between the electromagnetic actuators and to undergo radial motion when it is in rotation, means for supplying input current of each actuator, the supply means comprising means for controlling the input current of each actuator, according to the position of the shaft with respect to the actuators. The supply means comprise means for damping the radial motion of the shaft.

13 Claims, 4 Drawing Sheets

(58) Field of Classification Search
USPC .......................................... 310/90.5; 361/113
See application file for complete search history.

(56) References Cited

U.S. PATENT DOCUMENTS

| | | | | |
|---|---|---|---|---|
| 4,885,491 | A | * 12/1989 | Hiyama | .............. F16C 32/0487 |
| | | | | 310/90.5 |
| 7,830,056 | B2 | * 11/2010 | Barada | ................ F16C 32/0457 |
| | | | | 310/90.5 |
| 2003/0141772 | A1 | 7/2003 | Abel | |

FOREIGN PATENT DOCUMENTS

| | | |
|---|---|---|
| JP | H05 149338 | 6/1993 |
| JP | 2006336820 | 12/2006 |
| TW | 436586 B | 5/2001 |

OTHER PUBLICATIONS

R. Nordmann; Dynamics of Flexible Rotors; "Magnetic Bearings"; DOI 10.1007/978-3-642-00497-1 2; Springer-Verlag Berlin Heidelberg 2009.

Specification for U.S. Appl. No. 14/066,960, filed Oct. 30, 2014.

French Search Report from corresponding French Application No. 1260419, dated Jul. 1, 2013.

First Office Action and Search issued in connection with corresponding CN Application No. 201310532711.9 dated Dec. 20, 2016.

\* cited by examiner

ACTIVE MAGNETIC BEARING COMPRISING MEANS FOR DAMPING THE RADIAL MOTION OF A SHAFT OF A ROTARY MACHINE

BACKGROUND OF THE INVENTION

Field of the Invention

Embodiments of the present invention relate to an active magnetic bearing.

Description of Related Art

An active magnetic bearing of the aforementioned type is known from the document "Magnetic bearings—Theory design and applications to rotation machinery; G. Schweitzer-E. H. Masler; Springer 2009—ISBN 978-3-642-00497-1". As a first approximation, in particular for moderate rotation speeds of the shaft, the shaft of the rotary machine can be assimilated to a rigid solid in rotation. Such as approximation is however no longer valid for high or even very high rotation speeds of a shaft, for example if the rotary machine is a motor-compressor set used in the field of gas compression. In this case, the shaft undergoes radial motion when it is in rotation, due to the deformation thereof, and can then be assimilated to a flexible solid in rotation. Such an active magnetic bearing used in a motor-compressor set is described in the document EP 2 253 852 A1, for example.

Position sensors are generally used in such an active magnetic bearing, with these sensors measuring the position of the shaft at each instant. In order to reduce the bearing size, and to reduce the level of measurement noise caused by the actuators' electromagnetic field on the sensors, each position sensor is placed at a distance from the actuators. Consequently the position signals delivered by the sensors do not represent the radial motion of the shaft of the motor-compressor set at the actuators, and are liable to falsify the correction, by the actuator control means, of the radial motion of the shaft. This proves to be particularly the case when an actuator is situated close to a first antinode of a natural deformation mode of the shaft and the associated sensor is situated close to a second antinode, in phase opposition with the first antinode. Instead of being reduced, the motion of the shaft is then amplified, which degrades the performance of the active magnetic bearing.

SUMMARY OF THE INVENTION

Embodiments of the present invention remedy this drawback by proposing an active magnetic bearing having improved performance.

An embodiment of the present invention provides an active magnetic bearing. The active magnetic bearing comprises a plurality of electromagnetic actuators, each actuator receiving for control thereof an input current and being able to exert a radial force on a shaft of a rotary machine, with respect to the rotation axis of said shaft, the shaft being able to be held without contact between the electromagnetic actuators and to undergo radial motion when it is in rotation, and means for supplying input current to each actuator, the supply means comprising means for controlling the input current of each actuator, according to the position of the shaft with respect to the actuators, wherein the supply means comprise means for damping the radial motion of the shaft.

An embodiment of the present invention provides a drive train comprising an active magnetic bearing according to an embodiment.

According to an embodiment of the present invention, the active magnetic bearing comprises one or more of the following features, taken in isolation or in all technically possible combinations: each electromagnetic actuator comprises an excitation coil comprising an input terminal and an output terminal, and the damping means is connected between the input terminal and the output terminal of each coil; the control means comprises a plurality of control members, each control member being connected between the input terminal and the output terminal of one of the excitation coils; the damping means comprises at least one passive filter of the band-pass type, with each passive filter or filters connected between one of the control members and the excitation coil connected to said control member, with each passive filter or filters connected in parallel to said excitation coil and comprising a passive energy-dissipation component; wherein each passive filter or filters comprise a capacitor, a coil and a resistor connected in series; wherein the resonant frequency of each passive filter or filters is substantially equal to the frequency of a natural mode of radial deformation of the shaft; wherein the damping means comprise at least one stage for correcting the control current delivered by the control means, with the correction stage or stages connected between the input terminal of an excitation coil and the input of the control member connected to said excitation coil; the correction stage or stages comprise a corrector able to simulate a passive filter of the band-pass type, comprising a passive energy-dissipation component.

According to an embodiment of the present invention, there is provided a drive train comprising a rotary machine provided with rotary shaft, and at least one active magnetic bearing able to support the shaft of the machine, wherein the active magnetic bearing or bearings are defined above.

According to an embodiment of the present invention, the rotary machine of the drive train is an electric motor or a motor-compressor unit.

BRIEF DESCRIPTION OF THE DRAWINGS

These features and advantages of the invention will emerge from a reading of the following description, given solely by way of non-limitative example and made with reference to the accompanying drawings, in which.

DETAILED DESCRIPTION

Figure 1:
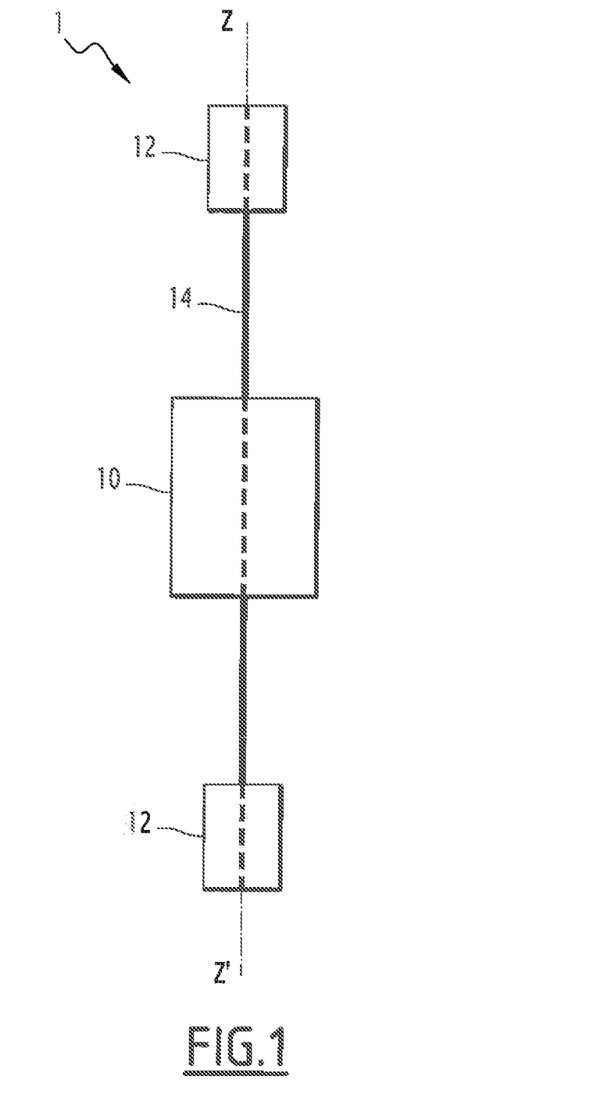
FIG. 1 is a schematic representation of a drive train according to an embodiment of the present invention, the drive train comprising two active magnetic bearings.

FIG. 1 shows a drive train 1 comprising a rotary machine 10 situated between two active magnetic bearings 12. The machine 10 is provided with a shaft 14 able to rotate about an axis Z-Z', and each active magnetic bearing 12 is able to support the shaft 14 of the electrical machine 10. In the embodiment, the rotary machine 10 is a rotary electrical machine, for example an electric motor, and has a nominal power greater than 100 kW, for example equal to 10 MW, and a rotation speed greater than 3,000 revolutions per minute, for example equal to 12,000 revolutions per minute. In a variant that is not shown, the rotary machine 10 is a motor-compressor unit.

In an embodiment, the drive train 1 comprises a number N of active magnetic bearings 12, N being an integer greater than or equal to one.

In the remainder of the description, reference will be made only to one bearing 12, the other bearing 12 having an identical structure and functioning. In addition, axial direction means the direction defined by the axis Z-Z' and radial direction any direction defined by an axis perpendicular to the axis Z-Z'. An orthogonal reference frame X-Y-Z is also defined with respect to the axis Z-Z', as illustrated in FIG. 2.

The shaft 14 is, for example, made from ferromagnetic material, and is able to undergo radial motion due to the deformation thereof when it is in rotation about the axis Z-Z'. The shaft 14 has for example a first natural radial deformation mode for a first vibration frequency f1 and a second natural radial deformation mode for a second vibration frequency f2.

Figure 2:
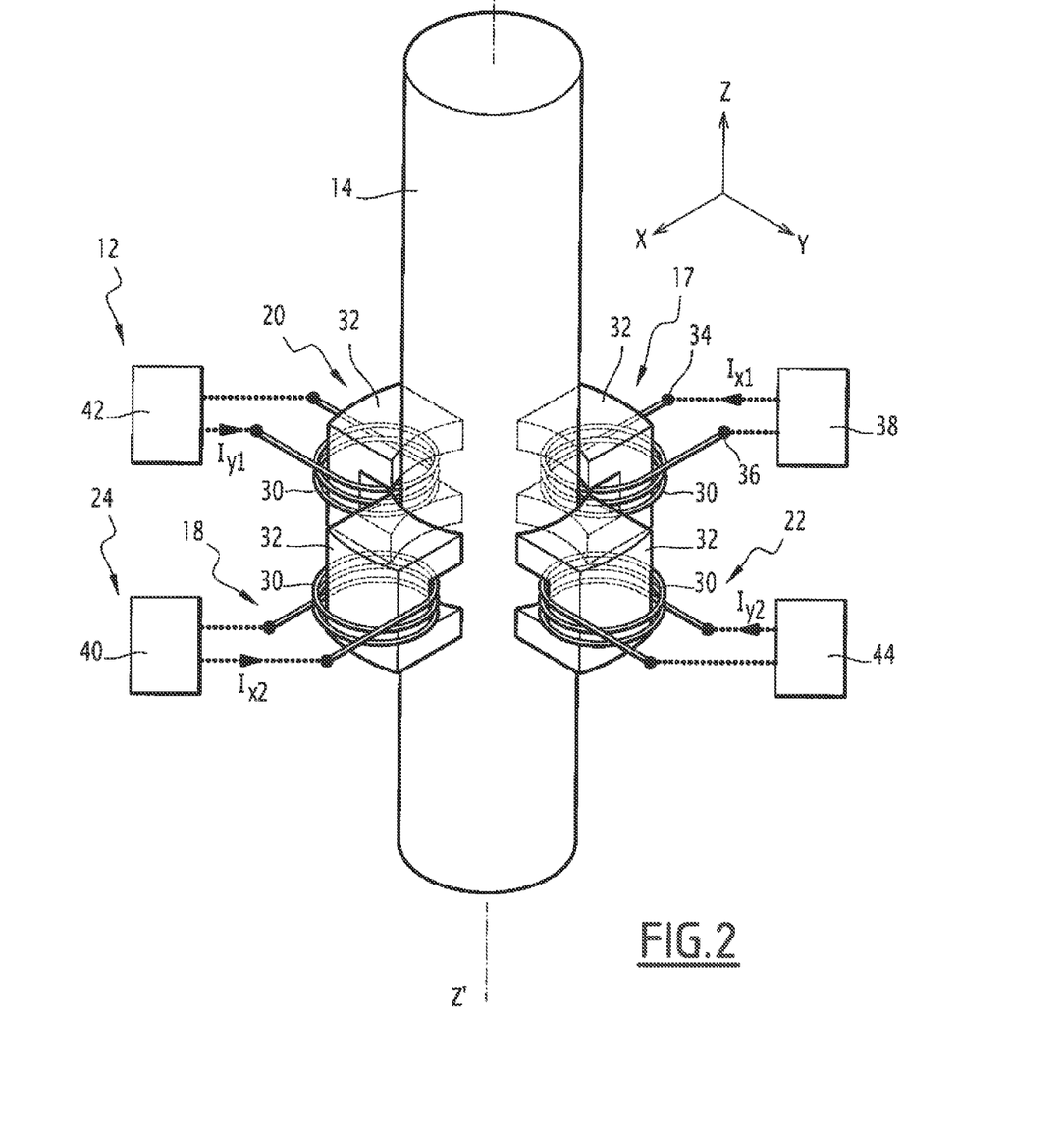
FIG. 2 is a schematic representation of an active magnetic bearing of FIG. 1, the bearing comprising four electromagnetic actuators each comprising a coil, and four devices supplying input currents to the coils.

As illustrated in FIG. 2, the bearing 12 comprises at least one electromagnetic actuator 17, 18, 20, 22. In the embodiment, the bearing 12 comprises a first electromagnetic actuator 17, a second electromagnetic actuator 18, a third electromagnetic actuator 20 and a fourth electromagnetic actuator 22. The bearing 12 also comprises means 24 for supplying input current to each actuator 17, 19, 20, 22.

The four actuators 17, 18, 20, 22 are immobile with respect to one another. They are able to exert radial forces on the shaft 14 in the directions X and Y perpendicular to the axis Z-Z' and to thus hold the shaft 14 in suspension, the shaft 14 being held without contact between the four actuators 17, 18, 20, and 22.

As known in the art, each actuator 17, 18, 20, 22 comprises an excitation coil 30 wound around a magnetic circuit 32 opposite the shaft 14 in order to apply radial forces to the shaft 14. The magnetic circuit 32 is for example made from ferromagnetic material.

Each actuator 17, 18, 20, 22 receives at the input of its coil 30 an input signal, more precisely an input control current. The first, second, third and fourth actuators 17, 18, 20, 22 receive respectively an input control current $I_{x1}$, $I_{x2}$, $I_{y1}$, $I_{y2}$.

Each excitation coil 30 comprises an input terminal 34 and an output terminal 36.

The supply means 24 comprise a first supply device 38, a second supply device 40, a third supply device 42 and a fourth supply device 44. The first, second, third and fourth supply devices 38, 40, 42, 44 are connected between the input terminal 34 and the output terminal 36 of the coil 30 of respectively the first, second, third and fourth actuators 17, 18, 20, 22.

Figure 3:
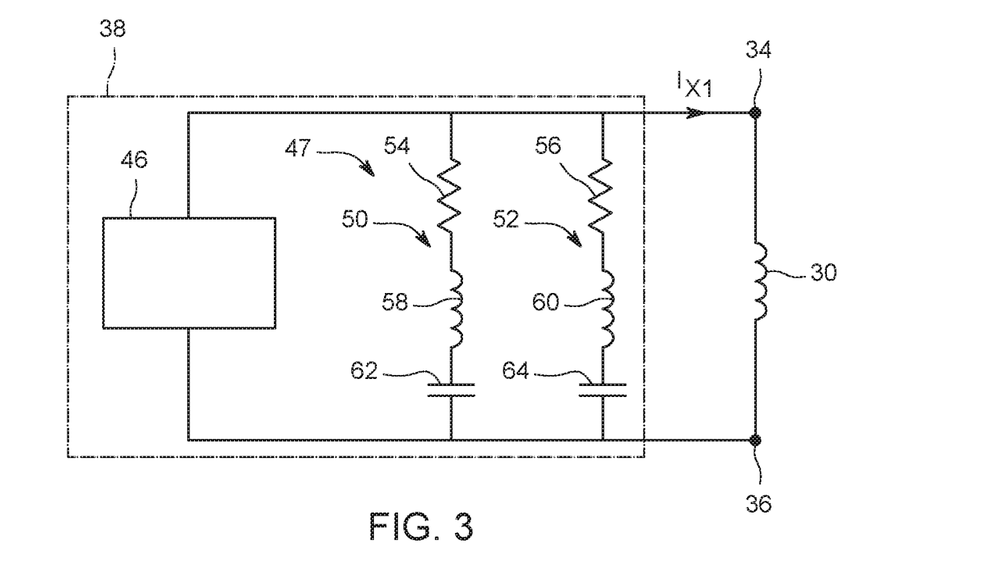
FIG. 3 is an electrical diagram of one of the supply devices of the magnetic bearing of FIG. 2 according to a first embodiment of the present invention.

As illustrated in FIG. 3, the first supply device 38 comprises a member 46 for controlling the input current of the first actuator 17, and means 47 for damping the radial motion of the shaft 14 in the direction X.

The control member 46 is connected between the input terminal 34 and the output terminal 36 of the excitation coil 30 of the first actuator 17. As known in the art, the control member 46 is able to calculate the input control current $I_{x1}$, according to a position signal representing the radial position of the shaft 14 in the direction X. This position signal is, for example, supplied by a position sensor, known conventionally and not shown in the Figures. The control member 46 is also able to deliver the input control current $I_{x1}$ to the input terminal 34 of the excitation coil 30.

The control member 46 is able to be connected to a reference current generator, not shown in the Figures. The reference current corresponds to a set current value, this set value being determined from the position signal representing the radial position of the shaft 14 in the direction X. The reference current generator comprises a filter, for example a low-pass filter, able to eliminate the set current values with a frequency equal to the first vibration frequency f1 or the second vibration frequency f2. In an embodiment, the filter is a frequency bandstop filter.

The damping means 47 are connected between the input terminal 34 and the output terminal 36 of the excitation coil 30 of the first actuator 17. The damping means 47 comprise at least one passive filter 50, 52 of the band-pass type. In the example embodiment in FIG. 3, the damping means 47 comprise a first passive filter 50 and a second passive filter 52. Each passive filter 50, 52 is connected between the control member 46 and the excitation coil 30, in parallel to the excitation coil 30.

The first passive filter 50 and respectively the second passive filter 52 comprise a first resistor 54 and respectively a second resistor 56, a first coil 58 and respectively a second coil 60, and a first capacitor 62 and respectively a second capacitor 64, connected in series between the input terminal 34 and the output terminal 36. The first passive filter 50 and respectively the second passive filter 52 have a first resonant frequency $f_{R1}$ and respectively a second resonant frequency $f_{R2}$.

In an embodiment, each passive filter 50, 52 is formed by any association of resistive, capacitive or inductive components connected together and constituting a band-pass filter having a resonant frequency.

In an embodiment also, each resistor 54, 56 is replaced by any passive energy-dissipation component.

The inductance of the first coil 58 and the capacitance of the first capacitor 62 are chosen that the first resonant frequency $f_{R1}$ is substantially equal to the first vibration frequency f1. For example, the first coil 58 has an inductance equal to 0.1 H and the first capacitor 62 has a capacitance of 10 µF.

Likewise, the inductance of the second coil 60 and the capacitance of the second capacitor 64 are chosen so that the second resonant frequency $f_{R2}$ is substantially equal to the second vibration frequency f2. For example, the second coil 60 has an inductance of 0.05 H and the second capacitor 64 has a capacitance of 5 µF.

A person skilled in the art will understand that that, in choosing the inductances of the coils 58, 60, account is taken of the inductance of the excitation coil 30. More precisely, the first resonant frequency $f_{R1}$ and respectively the second resonant frequency $f_{R2}$ depend on an equivalent inductance the expression of which is a function of the inductance of the excitation coil 30 and the inductance of the first coil 58, and respectively of the second coil 60.

The structures of the second, third and fourth supply devices 40, 42, 44 being identical to that of the first supply device 38, they are not described in any further detail.

The functioning of the active magnetic bearing 12 will now be explained.

Each control member 46 of an actuator 17, 18, 20, 22 at all times controls the position of the shaft 14 along a direction of the plane X-Y. Each control member 46 thus enables the corresponding actuator 17, 18, 20, 22 to compensate for the radial translation movement of the shaft 14 in a direction of the plane X-Y.

The shaft 14 moves radially according to the first natural deformation mode, the dimension of the air gaps situated between the shaft 14 and the actuators varies. In particular, the dimension of the air gap situated between the shaft 14 and the first actuator 17 varies.

This variation in the dimension of the air gap causes a variation in the electromagnetic flux in the excitation coil 30 of the first actuator 17, which generates a voltage signal at the terminals 34, 36 of the coil 30. This voltage signal has a frequency equal to the first vibration frequency f1 and represents the radial movement of the shaft 14 in the direction X. Following the appearance of this voltage, the first resonant frequency $f_{R1}$ being equal to the first vibration frequency f1, a current with a frequency equal to the first vibration frequency f1 is created in the first resistor 54 of the first passive filter 50. The electrical power dissipated in the first resistor 54 then reduces the mechanical energy of the radial movement of the shaft 14 in the direction X and thus provides the damping of the first natural deformation mode of the shaft 14.

In a similar manner, when the shaft 14 moves radially according to the second natural deformation mode, the second resonant frequency $f_{R2}$ being equal to the second vibration frequency f2, a current with a frequency equal to the second vibration frequency f2 is created in the second resistor 56 of the second passive filter 52. The electrical power relating to this current then dissipates entirely in the second resistor 56, thus providing the damping of the second natural deformation mode of the shaft 14.

In the same way, the damping means of the second supply device 40 damp the radial motion of the shaft 14 in the direction X and the damping means of the third and fourth supply devices 42, 44 damp the radial motion of the shaft 14 in the direction Y.

Consequently the natural radial deformation modes of the shaft 14 are damped by the magnetic bearing 12 according to the invention. It will thus be understood that the magnetic bearing 12 according to the invention has improved performance.

The magnetic bearing 12 also, because of the passive components used, damps the radial motion of the shaft 14 for natural modes having very high vibration frequencies.

In addition, the magnetic bearing 12 damps the radial motion of the shaft 14 independently of the position sensors used. Because of this the position sensors can be placed freely along the shaft 14, without any constraint of spatial proximity with the electromagnetic actuators.

Furthermore, the magnetic bearing 12 according to this first embodiment makes it possible, with respect to the magnetic bearing of the second embodiment described below, to reduce the computing power necessary in the control members. This is because, in this first embodiment, the damping of the radial motion of the shaft 14 is entirely done by the passive filters.

Figure 4:
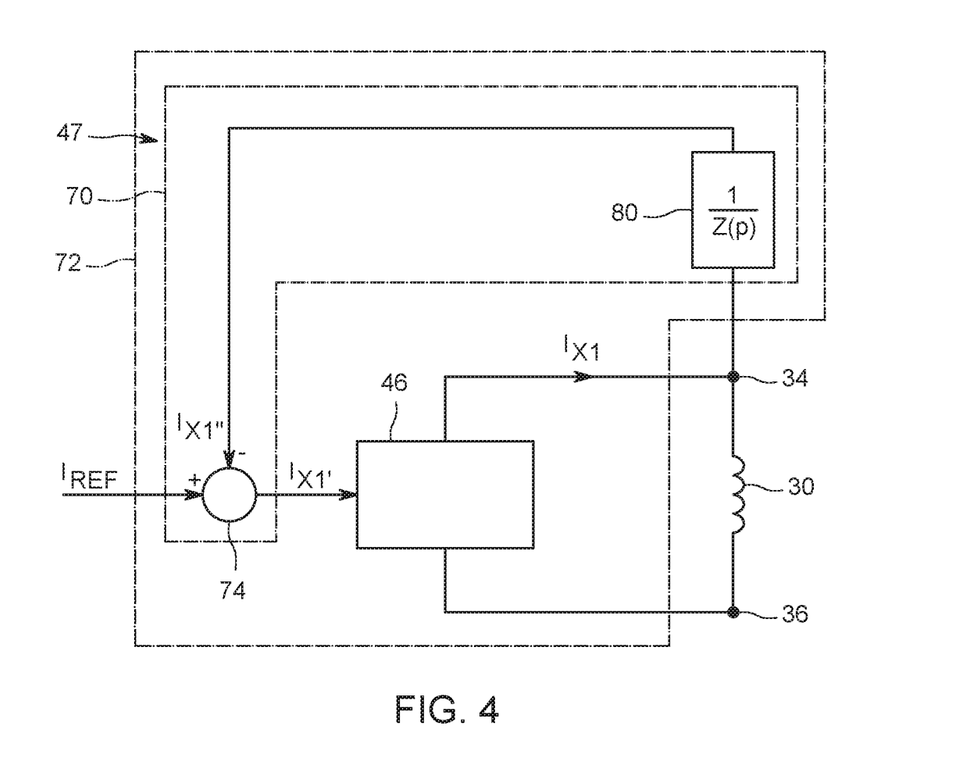
FIG. 4 is schematic representation of one of the supply devices of a magnetic bearing according to a second embodiment of the present invention, the supply device comprising a digital corrector.

FIG. 4 illustrates a second embodiment for which the elements similar to the first embodiment described previously are marked by identical references.

According to this second embodiment, the damping means 47 no longer comprise any passive filters 50, 52 of the band-pass type, and comprise a stage 70 for correcting the control current delivered by the control member 46.

The first supply device 38 comprises a device 72 for controlling the input current of the first actuator 17. The control device 72 comprises the control member 46.

The correction stage 70 belongs to the control device 72 and comprises a subtractor 74 and a digital corrector 80.

The correction stage 70 is able to supply an intermediate control current $I_{x1}'$ at the input of the control member 46.

The output of the subtractor 74 is connected to the input of the control member 46. The non-inverting input of the subtractor 74 is able to be connected to the reference current generator $I_{ref}$, comprising a filter able to eliminate the set frequency currents equal to the first vibration frequency f1 or to the second vibration frequency f2.

The corrector 80 is connected between the output terminal 34 of the excitation coil 30 of the first actuator 17 and the inverting input of the subtractor 74. The corrector 80 is able to supply a correction current $I_{x1}''$ on the inverting input of the subtractor 74.

The corrector 80 has a transfer function Z'(p), with $$Z'(p) = \frac{1}{Z(p)},$$

Z(p) is expressed for example, with the Laplace transformation, as follows:

$$Z(p) = R + p \cdot L + \frac{1}{p \cdot C}.$$

The corrector 80 is able to simulate a passive filter of the band-pass type comprising a passive energy-dissipation component, which is to say to model the behavior of such a passive filter by means of electronic control components. In the example embodiment, the corrector 80 is able to simulate a passive filter comprising a resistor, a coil and a capacitor connected in series.

The coefficient R is chosen so as to be equal to the resistance of the passive filter simulated by the corrector. Likewise, the coefficient L is chosen so as to be equal to the inductance of the coil of the passive filter simulated by the corrector, and the coefficient C is chosen so as to be equal to the capacitance of the capacitor of the passive filter simulated.

The coefficients R, L and C are also chosen so that the corrector 80 simulates a passive filter of the band-pass type having the first resonant frequency $f_{R1}$ equal to the first vibration frequency f1.

Since the structures of the second, third and fourth supply devices 40, 42, 44 according to this second embodiment are identical to that of the first supply device 38 according to this second embodiment, they are not described in any further detail.

The functioning of the active magnetic bearing 12 according to the second embodiment of the invention will now be explained.

Initially, the shaft 14 moves radially according to its first natural deformation mode. Following this radial movement, a current with a frequency equal to the first vibration frequency f1 is created in the corrector 80. The corrector 80 simulating a passive filter having the first resonant frequency $f_{R1}$ equal to the first vibration frequency f1, the corrector 80 generates a correction current $I_{x1}''$ on the inverting input of the subtractor 74. This current is then subtracted from the reference current $I_{ref}$ by the subtractor 74, in order to supply the intermediate control current $I_{x1}'$. This injection of a correction current $I_{x1}''$ by the corrector 80 at the input of the control member 46 thus reduces the mechanical energy of the radial movement of the shaft 14 in the direction of X.

The first natural radial deformation mode of the shaft 14 is thus damped by the magnetic bearing 12 according to the second embodiment.

By comparison with the active magnetic bearing according to the first embodiment, the magnetic bearing according to the second embodiment has a smaller size. The costs of manufacturing the active magnetic bearing according to the second embodiment are therefore reduced compared with those of the active magnetic bearing according to the first embodiment described previously.

Figure 5:
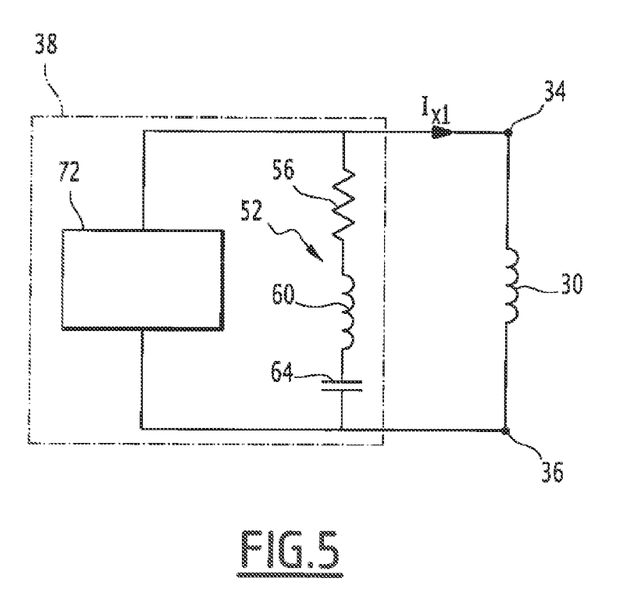
FIG. 5 is a diagram similar to FIG. 3 of one of the supply devices of a magnetic bearing according to a third embodiment of the present invention.

FIG. 5 illustrates a third embodiment for which the elements similar to the first and second embodiments described previously are marked by identical references.

According to this third embodiment, the damping means 47 comprise the second passive filter 52, and the correction stage 70 situated in the control device 72.

When the shaft 14 moves radially according to its first natural deformation mode, the functioning of the active magnetic bearing according to this third embodiment is similar to that of the active magnetic bearing according to the second embodiment described previously. When the shaft 14 moves radially according to its second natural deformation mode, the functioning of the active magnetic bearing according to this third embodiment is similar to that of the active magnetic bearing according to the first embodiment described previously. The functioning of this third embodiment is therefore not described again.

The advantages of this third embodiment of the active magnetic bearing are obtained by the combination between the advantages of the first embodiment and the advantages of the second embodiment, and are therefore not described again.

It will thus be understood that the magnetic bearing according to the present invention has improved performance.

An active magnetic bearing makes it possible to hold a moving body in suspension, typically a shaft of a rotary machine, in a fixed position. It enables the shaft of the machine to rotate without friction or contact about a rotation axis. In the particular field of very high speed motors, such a bearing significantly increases the service life of the moving mechanical parts and thus limits maintenance operations on these parts.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. An active magnetic bearing comprising:
   a plurality of electromagnetic actuators, each of the electromagnetic actuators receiving an input current and being able to exert a radial force on a shaft of a rotary machine, with respect to the rotation axis of the shaft, the shaft configured to be held without contact between the electromagnetic actuators and to undergo radial motion when in rotation; and
   supply means configured to supply the input current to each of the electromagnetic actuators, the supply means comprises a control means configured to control the input current of each of the electromagnetic actuators according to the position of the shaft with respect to the electromagnetic actuators, wherein the supply means comprises a damping means configured to dampen the radial motion of the shafts
   each of the electromagnetic actuators comprising an excitation coil having an input terminal and an output terminal the damping means being configured to connect between the input terminal and the output terminal of each of the excitation coils;
   the control means comprising a plurality of control members, each of the control members being connected between the input terminal and the output terminal of one of the excitation coils; and
   the damping means comprising at least one passive filter of the band-pass type, wherein the at least one passive filter is connected between one of the control members and the excitation coil connected to the control member, and wherein the at least one passive filter is connected in parallel with the excitation coil and comprises a passive energy-dissipation component.

2. The magnetic bearing according to claim 1, wherein the at least one passive filter comprises a capacitor, a coil, and a resistor connected in series.

3. The magnetic bearing according to claim 2, wherein the resonant frequency of the at least one passive filter is substantially equal to the frequency of a natural radial deformation mode of the shaft.

4. The magnetic bearing according to claim 1, wherein the resonant frequency of the at least one passive filter is substantially equal to the frequency of a natural radial deformation mode of the shaft.

5. The magnetic bearing according to claim 1 wherein the damping means comprises at least one stage configured to correct a control current delivered by the controller, wherein the at least one correction stage is connected between the input terminal of an excitation coil and an input of the control member connected to the excitation coil.

6. The magnetic bearing according to claim 5, wherein the at least one correction stage comprises a corrector configured to simulate a passive filter of the band-pass type comprising a passive energy-dissipation component.

7. A drive train comprising:
   a rotary machine comprising a rotary shaft; and
   at least one active magnetic bearing configured to support the shaft of the rotary machine, the active magnetic bearing comprising:
   a plurality of electromagnetic actuators, each of the electromagnetic actuators receiving an input current and being able to exert a radial force on the shaft of the rotary machine, with respect to the rotation axis of the shaft, the shaft configured to be held without contact between the electromagnetic actuators and to undergo radial motion when in rotation;
   supply means configured to supply the input current to each of the electromagnetic actuators, the supply means comprising a control means configured to control the input current of each of the electromagnetic actuators according to the position of the shaft with respect to the electromagnetic actuators, the supply means further comprising a damping means configured to dampen the radial motion of the shafts
   each of the electromagnetic actuators comprising an excitation coil having an input terminal and an output terminal, the damping means being configured to connect between the input terminal and the output terminal of each of the excitation coils;

the control means comprising a plurality of control members, each of the control members being connected between the input terminal and the output terminal of one of the excitation coils; and the damping means comprising at least one passive filter of the band-pass type, wherein the at least one passive filter is connected between one of the control members and the excitation coil connected to the control member, and wherein the at least one passive filter is connected in parallel with the excitation coil and comprises a passive energy-dissipation component.

8. The drive train according to claim 7, wherein the rotary machine is an electric motor or a motor-compressor unit.

9. The drive train according to claim 7, wherein the at least one passive filter comprises a capacitor, a coil, and a resistor connected in series.

10. The drive train according to claim 7, wherein the resonant frequency of the at least one passive filter is substantially equal to the frequency of a natural radial deformation mode of the shaft.

11. The drive train according to claim 7, wherein the resonant frequency of the at least one passive filter is substantially equal to the frequency of a natural radial deformation mode of the shaft.

12. The drive train according to claim 7 wherein the damping means comprises at least one stage configured to correct a control current delivered by the controller, wherein the at least one correction stage is connected between the input terminal of an excitation coil and an input of the control member connected to the excitation coil.

13. The drive train according to claim 12, wherein the at least one correction stage comprises a corrector configured to simulate a passive filter of the band-pass type comprising a passive energy-dissipation component.

* * * * *